(12) United States Patent
Snyder et al.

(10) Patent No.: US 11,975,598 B2
(45) Date of Patent: May 7, 2024

(54) VEHICLE DOOR ASSEMBLY

(71) Applicant: NISSAN NORTH AMERICA, INC., Franklin, TN (US)

(72) Inventors: David Snyder, Southfield, MI (US); David Kovie, Livonia, MI (US)

(73) Assignee: Nissan North America, Inc., Franklin, TN (US)

( * ) Notice: Subject to any disclaimer, the term of this patent is extended or adjusted under 35 U.S.C. 154(b) by 64 days.

(21) Appl. No.: 17/748,870

(22) Filed: May 19, 2022

(65) Prior Publication Data
US 2023/0373276 A1    Nov. 23, 2023

(51) Int. Cl.
*B60J 5/04*    (2006.01)
(52) U.S. Cl.
CPC ............ *B60J 5/045* (2013.01); *B60J 5/0436* (2013.01)
(58) Field of Classification Search
CPC ........ B60J 5/0436; B60J 5/045; B60J 5/0413; B60J 5/042; B60J 5/043; B60R 1/06
USPC ...................................... 296/146.6
See application file for complete search history.

(56) References Cited

U.S. PATENT DOCUMENTS

| | | | |
|---|---|---|---|
| 9,016,747 B2* | 4/2015 | Kuroki | B60R 1/06 296/1.11 |
| 9,346,340 B2 | 5/2016 | Ishigame et al. | |
| 10,076,950 B2* | 9/2018 | Usui | B60J 5/0404 |
| 10,538,278 B2* | 1/2020 | Guha | B29C 66/112 |
| 10,988,005 B2* | 4/2021 | Tomeki | B60J 5/0413 |
| 11,027,600 B2 | 6/2021 | Schneider et al. | |
| 2002/0073627 A1* | 6/2002 | Hock | B60J 5/0406 49/502 |

FOREIGN PATENT DOCUMENTS

CA    2850012 A1    4/2013

* cited by examiner

*Primary Examiner* — Joseph D. Pape
(74) *Attorney, Agent, or Firm* — Global IP Counselors, LLP

(57) ABSTRACT

A vehicle door assembly includes inner and outer door panels, first and second support brackets, a reinforcing panel, a window opening support panel and a side mirror assembly. The first support bracket is attached to the inner door panel. The reinforcing panel is attached to the first support bracket. The second support panel attached to the first support panel and the reinforcing panel. The window opening support panel is attached to the inner door panel, the second support panel and the reinforcing panel. The outer door panel is fixed to the inner door panel such that the inner door panel and the outer door panel define a door cavity therebetween. The side mirror assembly is installed along an exterior side of the outer door panel. The side mirror assembly includes fasteners that extend through the window opening support panel and the second support panel.

15 Claims, 14 Drawing Sheets

VEHICLE DOOR ASSEMBLY

BACKGROUND

Technical Field

The present disclosure generally relates to a vehicle door assembly. More specifically, the present disclosure relates to a vehicle door assembly that includes a reinforcing panel that stiffens the overall structure of the door assembly in particular in an area of the door assembly that supports a side mirror assembly.

Background Information

Side view mirrors are typically installed to areas of a vehicle door assembly adjacent to a window at or at least partially above the bottom end of a window opening of the door assembly. Side view mirror are also sometimes installed to the door assembly at a location below the bottom end of the window opening.

SUMMARY

One object of the present disclosure is to provide a vehicle door assembly with a reinforcing panel that strengthens and stiffens the vehicle door assembly in an area where a side mirror assembly is installed.

In view of the state of the known technology, one aspect of the present disclosure is to provide a vehicle door assembly with an inner door panel, a first support bracket, a reinforcing panel, a second support panel, a window opening support panel, and outer door panel and a side mirror assembly. The first support bracket is attached to a front portion of the inner door panel. The reinforcing panel is attached to the first support bracket. The second support panel is attached to the first support panel and the reinforcing panel. The window opening support panel is attached to a rear portion of the inner door panel, the second support panel and the reinforcing panel. The outer door panel is fixed to an outer periphery of the inner door panel such that the inner door panel and the outer door panel define a door cavity therebetween. The side mirror assembly is installed along an exterior side of the outer door panel. The side mirror assembly includes fasteners that extend through the window opening support panel and the second support panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only, and not for the purpose of limiting the invention as defined by the appended claims and their equivalents.

Figure 1:
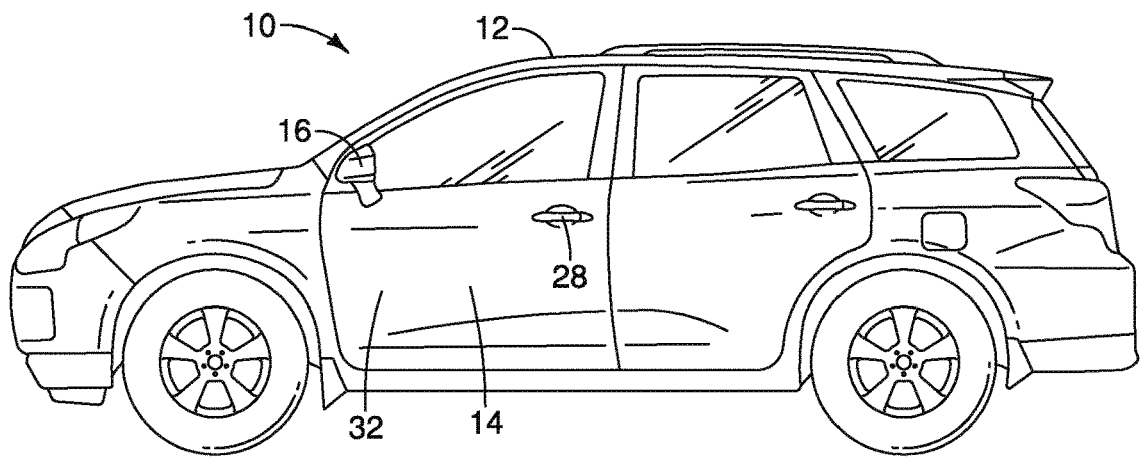
FIG. 1 is a side view of a vehicle having a vehicle door assembly with a side mirror assembly attached to the door assembly in accordance with an exemplary embodiment.

Referring initially to FIG. 1, a vehicle 10 is illustrated in accordance with a first embodiment. The vehicle 10 includes a vehicle body structure 12 with at least one door assembly 14 (also referred to as a vehicle door assembly 14).

Figure 3:
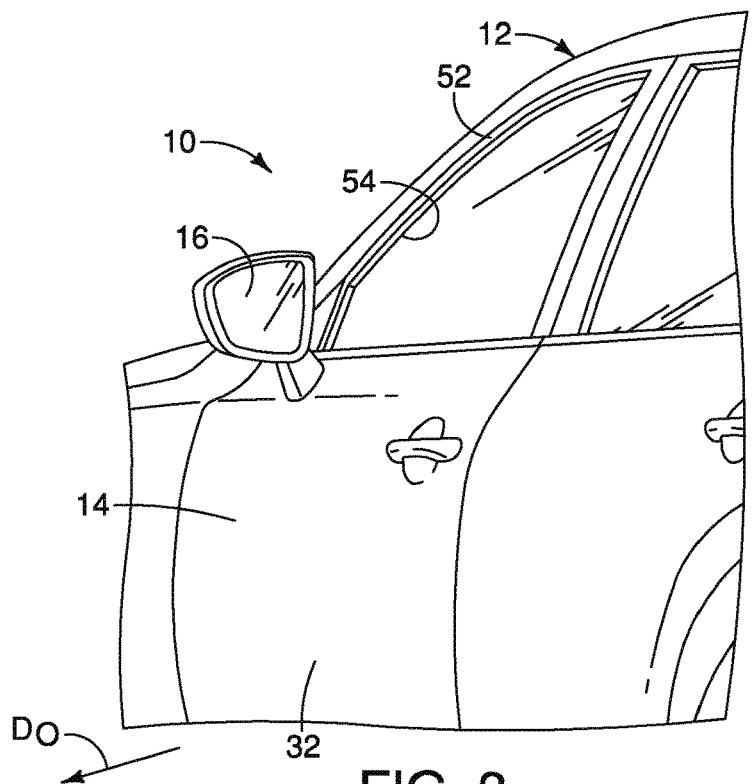
FIG. 3 is a perspective view of the vehicle showing the side mirror assembly installed to the vehicle door assembly in accordance with the exemplary embodiment.

As shown in FIGS. 1 and 3, a side mirror assembly 16 is attached to the door assembly 14 at a location below a window 18. The door assembly 14 structured to provide rigid support for the side mirror assembly 16, as is described in greater detail below.

As shown in FIGS. 2 and 4-7, the door assembly 14 includes an inner door panel 20, lower reinforcement beams 22 and 24, a first support bracket 26, a window track 28, a reinforcement assembly 30 and an outer door panel 32 (shown in FIGS. 1 and 3). Most, if not all, of the elements that make up the door assembly 14 can be made of aluminum, aluminum alloy or other metallic materials.

As shown in FIGS. 2, 4, 6 and 8, the inner door panel 20 itself can be assembled from a plurality of panel portions 20a, 20b and 20c that are welded or otherwise fixed to one another at seams $S_1$ and $S_2$. Although the inner door panel 20 is assembled from the plurality of panels 20a, 20b and 20c, for purpose of description herein below, the inner door panel 20 is a single element of the door assembly 14.

The inner door panel 20 is shaped and dimensioned to include a main panel portion 34, a front peripheral portion 36, a rear peripheral portion 38 and a lower peripheral portion 40. The main panel portion 34 extends the full horizontal length of the door assembly 14 from the front peripheral portion 36 to the rear peripheral portion 38 and downward to the lower peripheral portion 40.

Figure 5:
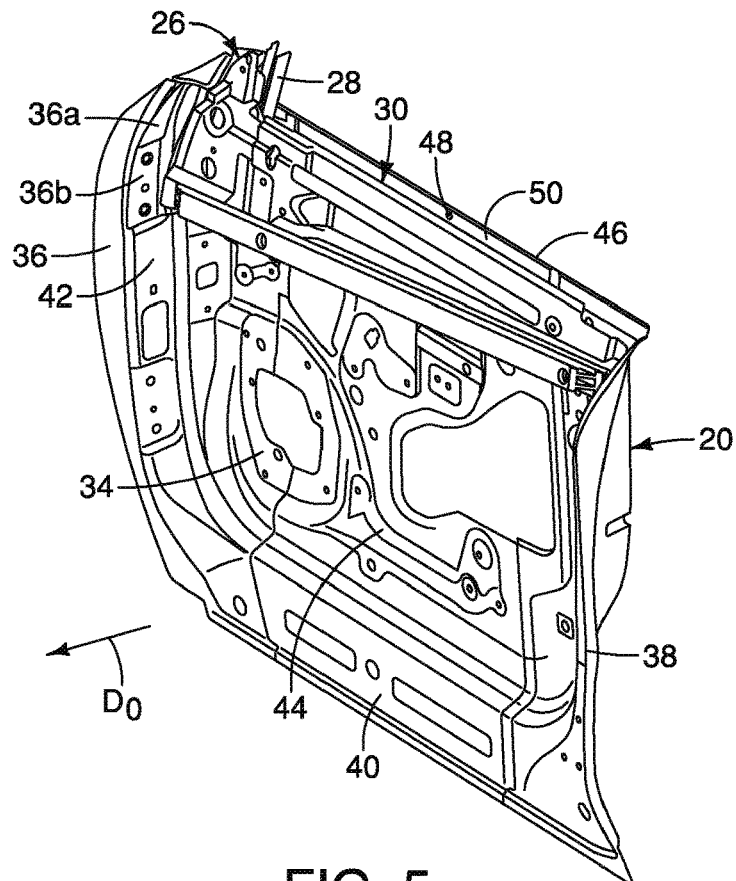
FIG. 5 is a perspective view of the vehicle door assembly partially dis-assembled to show features of the inner door panel and the reinforcement assembly in accordance with the exemplary embodiment.
Figure 6:
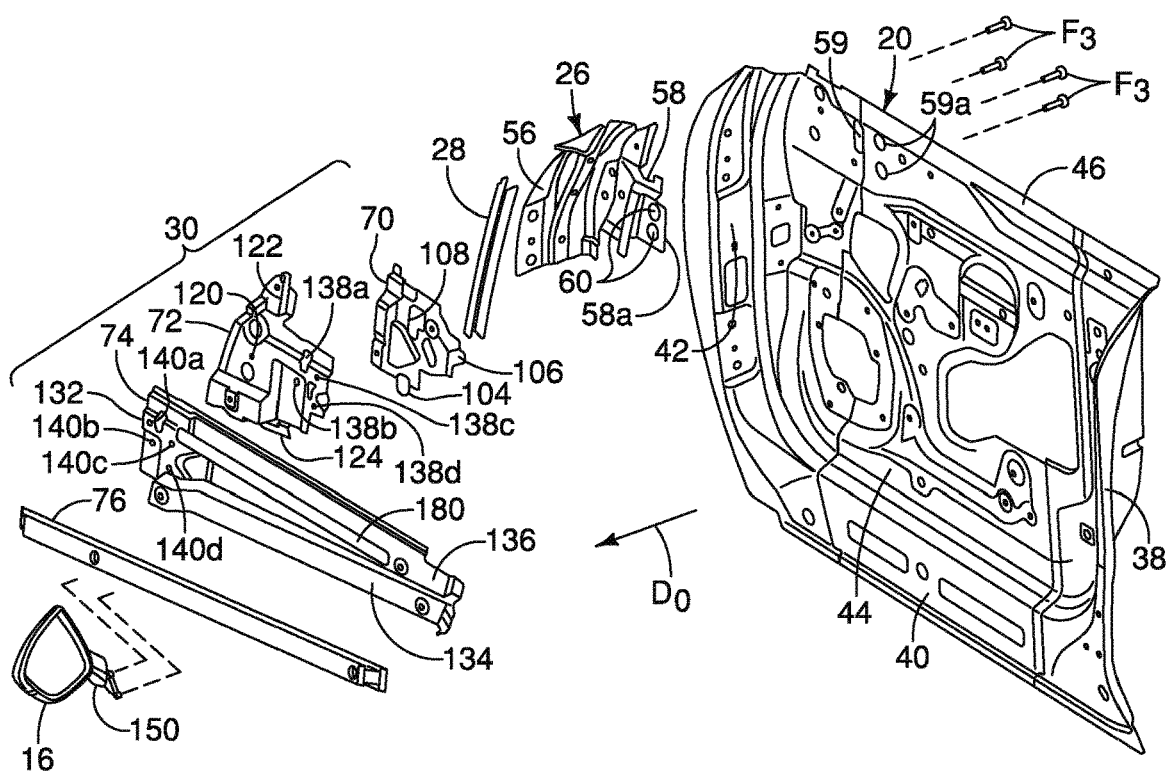
FIG. 6 is an exploded perspective view of the vehicle door assembly showing the inner door panel, a first support bracket, a portion of a window track and elements of the reinforcement assembly including a reinforcing panel, a second support panel, a window opening support panel and a stiffening beam in accordance with the exemplary embodiment.

As shown in FIGS. 5 and 6, the front peripheral portion 36 includes a section 42 that extends laterally in an outboard direction $D_O$ from the main panel portion 34. The main panel portion 34, the section 42 of the front peripheral portion 36, the rear peripheral portion 38 and the lower peripheral portion 40 define inboard, rearward, lower and forward boundaries of a door cavity 44 that is further confined between the main panel portion 34 of the inner door panel 20 and the outer door panel 32.

Figure 8:
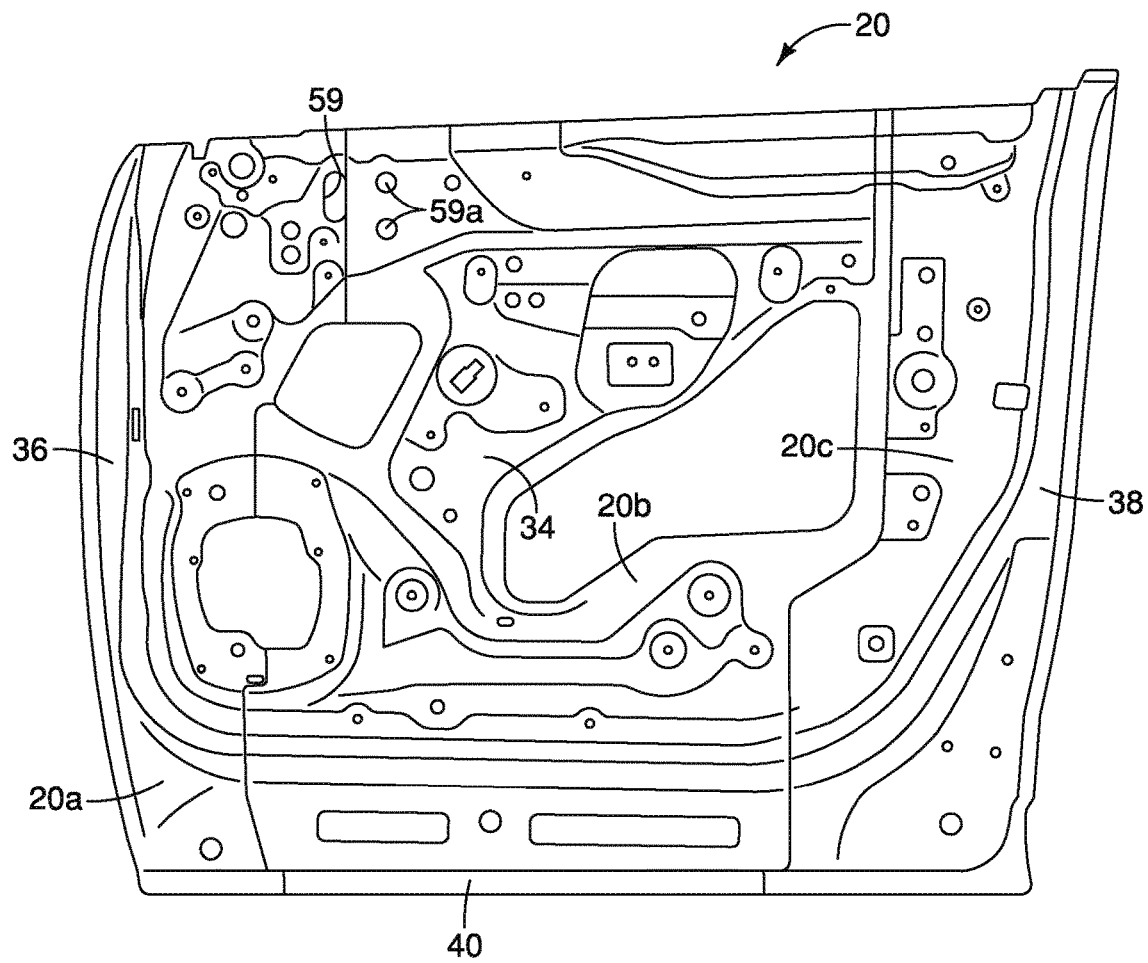
FIG. 8 is a side view of the inner door panel showing the various panels fixed to one another to form the inner door panel in accordance with the exemplary embodiment.
Figure 19:
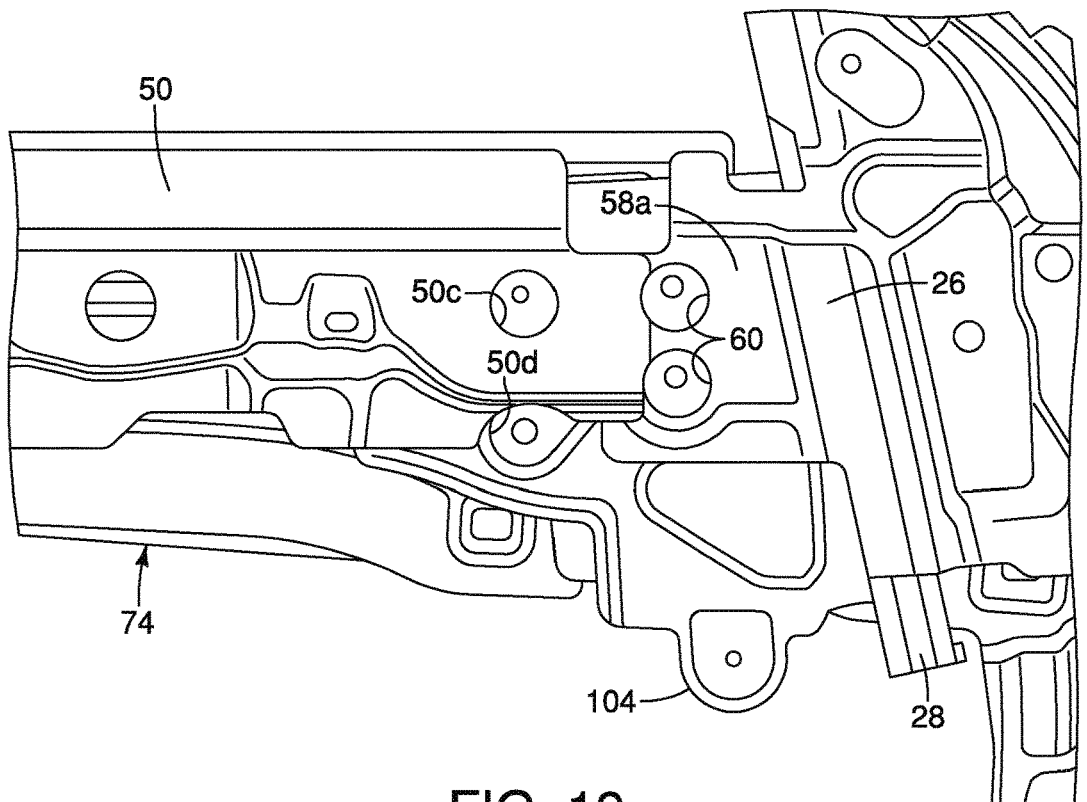
FIG. 19 is another view of the reinforcement assembly with a stiffening panel of the inner door panel and the first support bracket overlaying a forward portion of the inboard side of the reinforcement assembly in accordance with the exemplary embodiment.

As shown in FIG. 5, an upper edge portion 46 of the inner door panel 20 defines an inboard side of a window slot 48. The upper edge portion 46 can include a window slot stiffener 50 that is welded or otherwise fixedly attached to the upper edge portion 46 of the inner door panel 20. The window slot stiffener 50 is also depicted in FIG. 19 but with the inner door panel 20 removed to reveal further details discussed below. The window slot stiffener 50 includes fastener alignment openings 50c and 50d that are provided for installation of the side mirror assembly 16, as is described further below. A window rail 52 is attached to the upper ends of the front peripheral portion 36 and the rear peripheral portion 38 of the inner door panel 20 defining a window opening 54. As shown in FIGS. 6 and 8, the main panel portion 34 of the inner door panel 20 includes a mirror access slot 59 and a pair of mirror access openings 59a, whose function is described in greater detail below.

Figure 2:
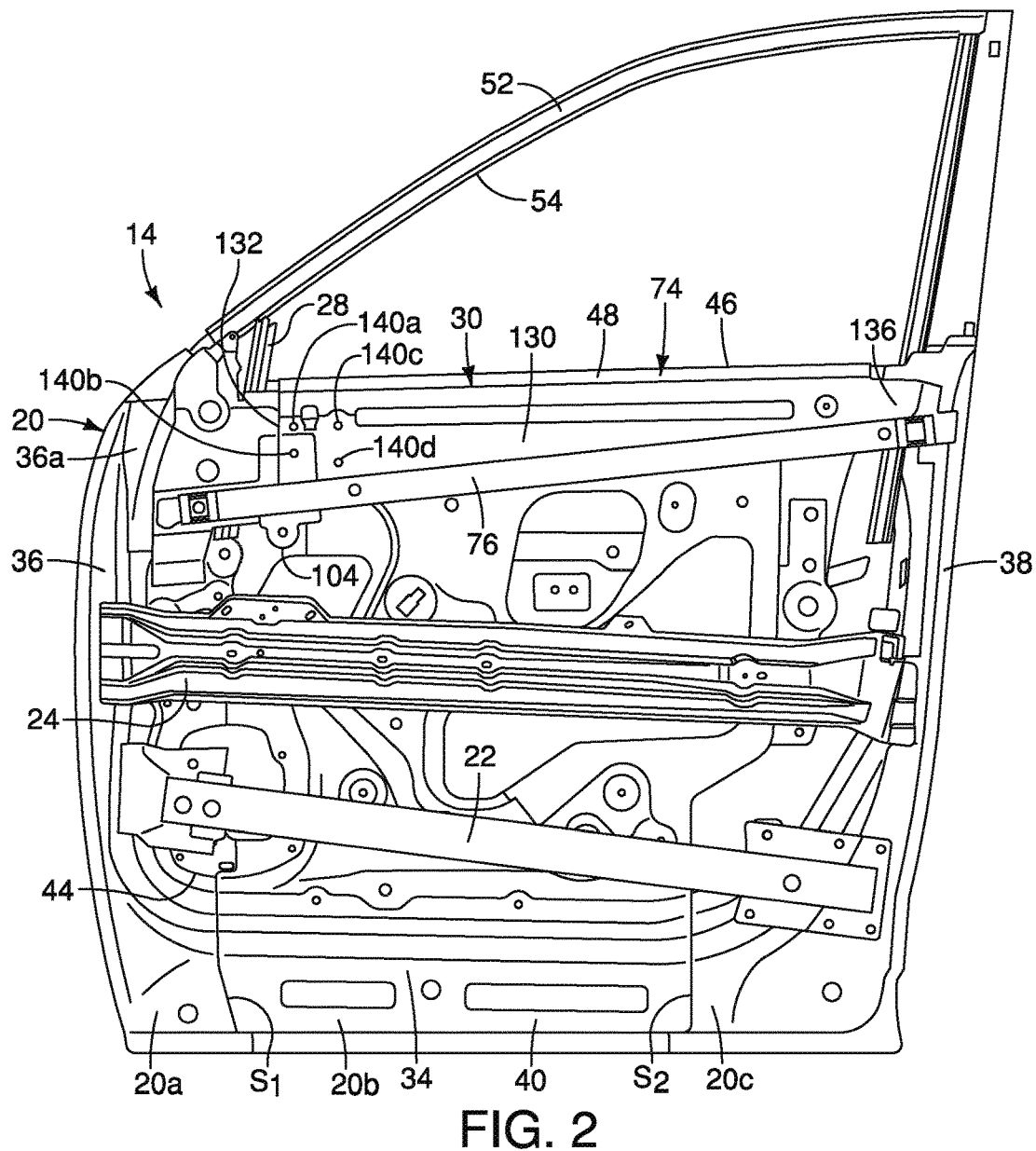
FIG. 2 is a side view of the vehicle door assembly with the side mirror assembly and an outer door panel removed showing a reinforcement assembly attached to an inner door panel in accordance with the exemplary embodiment.

As shown in FIGS. 2 and 6, the lower reinforcement beams 22 and 24 are conventional reinforcement structural elements that are well known in the art. The lower reinforcement beams 22 and 24 extend between and are fixed to the front peripheral portion 36 and the rear peripheral portion 38. Since the lower reinforcement beams 22 and 24 are conventional structural features, further description is omitted for the sake of brevity.

Figure 9:
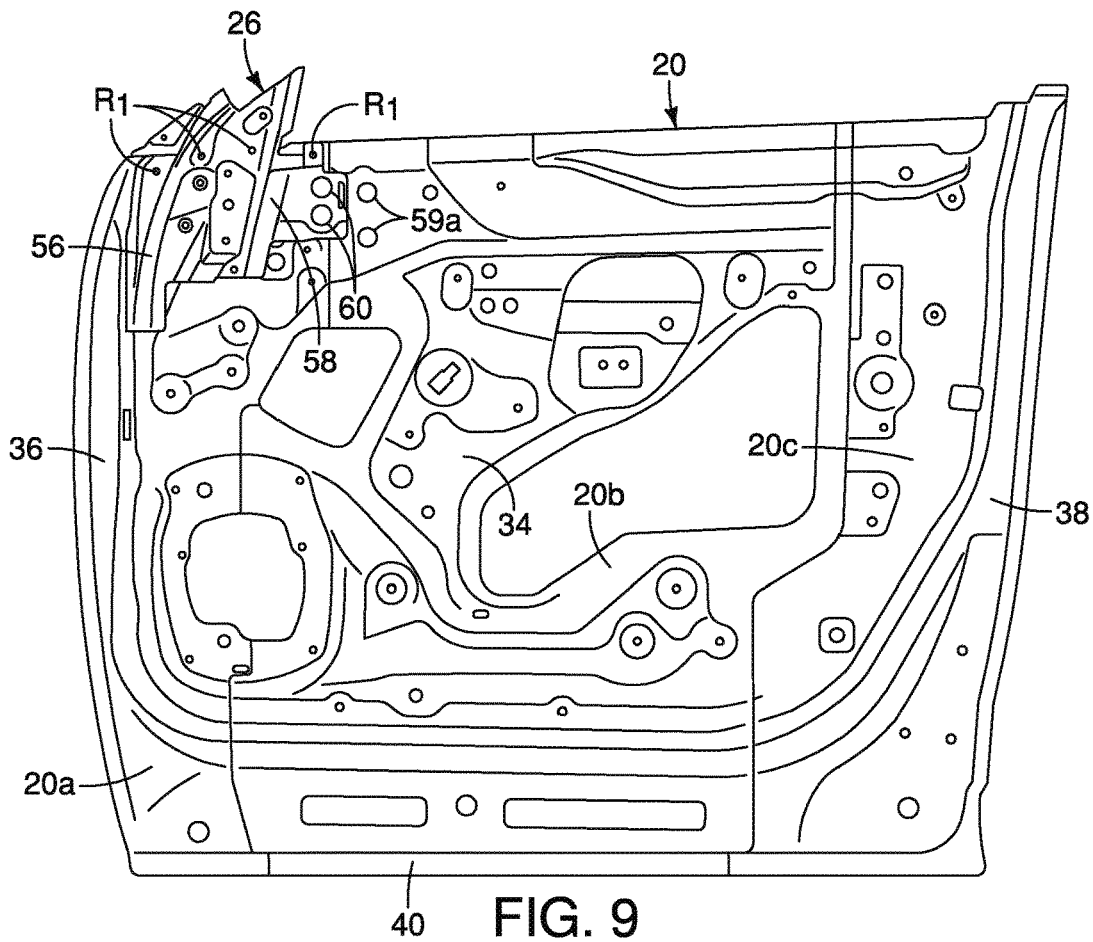
FIG. 9 is another side view of the inner door panel with the first support bracket installed thereto in accordance with the exemplary embodiment.
Figure 10:
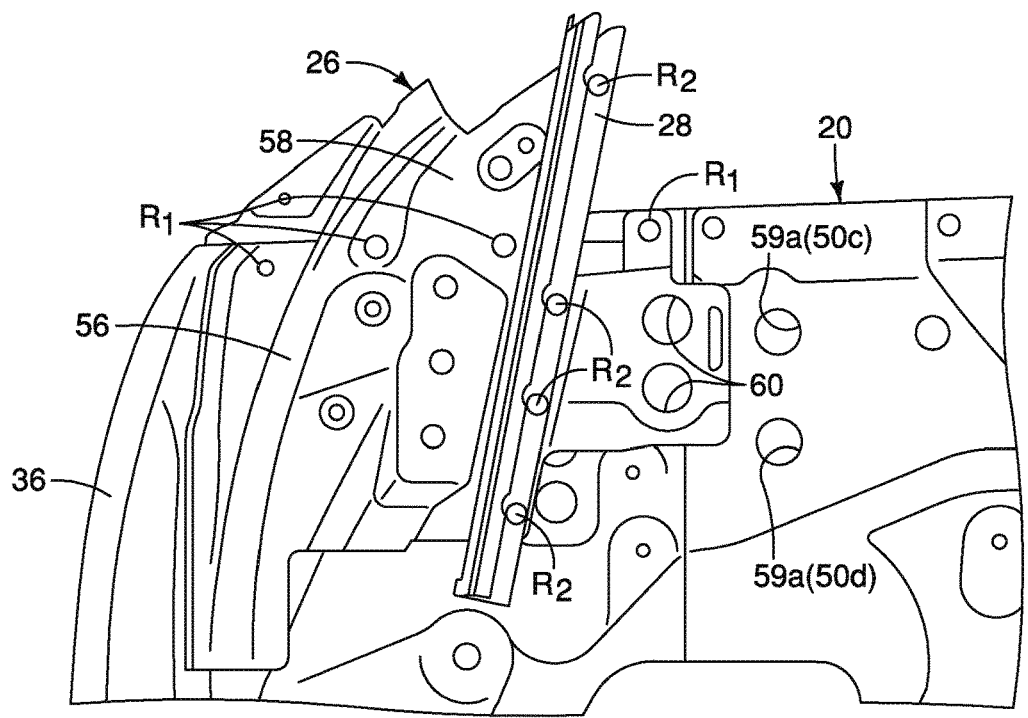
FIG. 10 is a side view of a portion of the inner door panel depicted in FIG. 9 with the portion of the window track installed to the first support bracket in accordance with the exemplary embodiment.

As shown in FIGS. 5, 6 and 9, the first support bracket 26 includes a first portion 56 and a second portion 58. The first portion 56 extends laterally in the outboard direction $D_O$ from the second portion 58 and overlays an upper area 36a of the front peripheral portion 36 of the inner door panel 20. The upper area 36a of the front peripheral portion 36 and the first portion 56 of the first support bracket 26 define an upper hinge area 36b of the door assembly 14. An upper hinge (not shown) is attached to the upper hinge area 36b and supports the door assembly 14 to the A-pillar of the vehicle body structure 12 in a conventional manner. The second portion 58 overlays a forward upper area 34a of the main panel portion 34 of the inner door panel 20 and is fixed thereto via rivets $R_1$.

As shown in FIG. 9, a rearward section 58a second portion 58 of the first support bracket 26 includes two mirror fastener access openings 60 that align with an access slot 59 of the inner door panel 20. As is also shown in FIG. 9, the first support bracket 26 does not extend rearward to the mirror access openings 59a. Thus, in FIG. 9, the mirror access openings 59a are visible.

The first support bracket 26 is attached to the inner door panel 20 via the rivets $R_1$, as shown in FIG. 9. The window track 28 is attached to the second portion 58 of the first support bracket 26 via rivets $R_2$. The window track 28 is aligned with the window slot 48 in a conventional manner. With the reinforcement assembly 30 installed to the inner door panel 20, the window track 28 is located between the first support bracket 26 and the reinforcement assembly 30, as shown in cross-section in FIG. 7.

Figure 11:
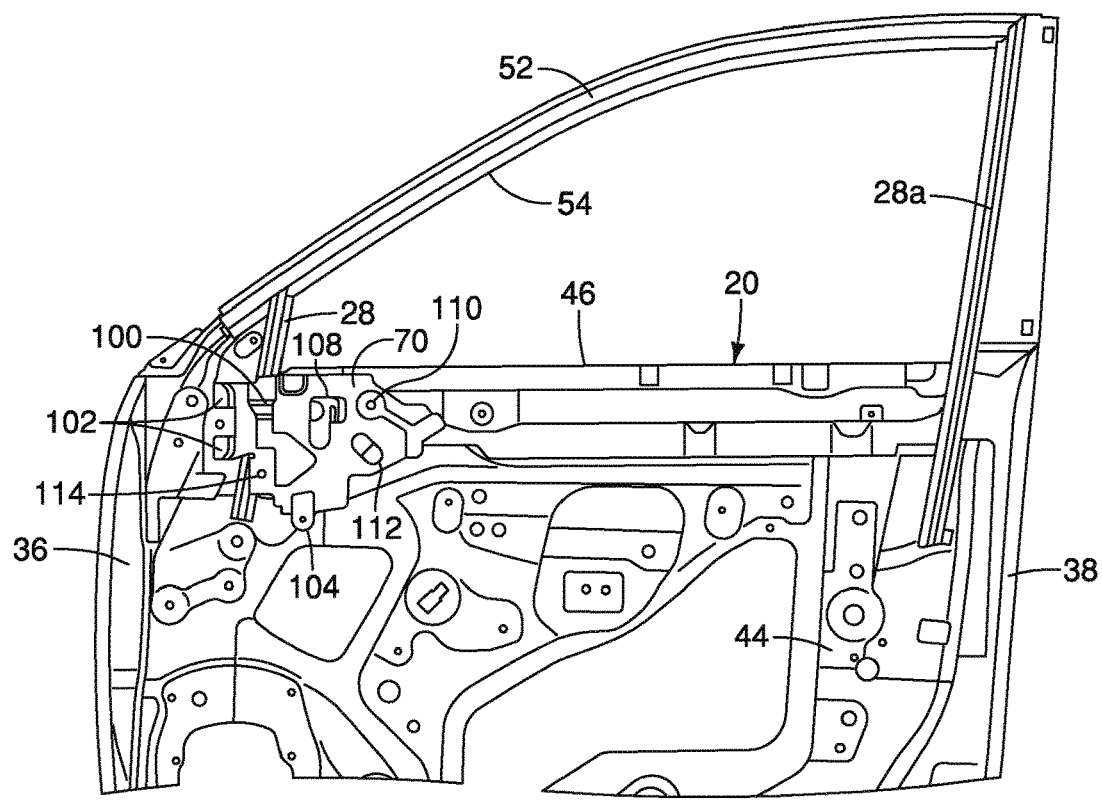
FIG. 11 is a side view of the inner door panel, the first support bracket and the portion of the window track showing the reinforcing panel removed from the reinforcement assembly with the reinforcing panel overlaying the first support bracket and the window track in its installed orientation in accordance with the exemplary embodiment.

As shown in FIG. 11, the window rail 52 is attached to the inner door panel 20 and the first support bracket 26 in a conventional manner. Once the window rail 52 is installed, the window opening 54 is defined between the window rail 52 and the upper edge portion 46 of the inner door panel 20. As shown in FIG. 11, the window rail 52 includes a rear window track 28a. Since window tracks, such as the window track 28 and the rear window track 28a are conventional structures, further description will be omitted for the sake of brevity.

As shown in FIG. 6, the reinforcement assembly 30 includes a reinforcing panel 70, a second support panel 72, a window opening support panel 74 and a stiffening beam 76.

Figure 7:
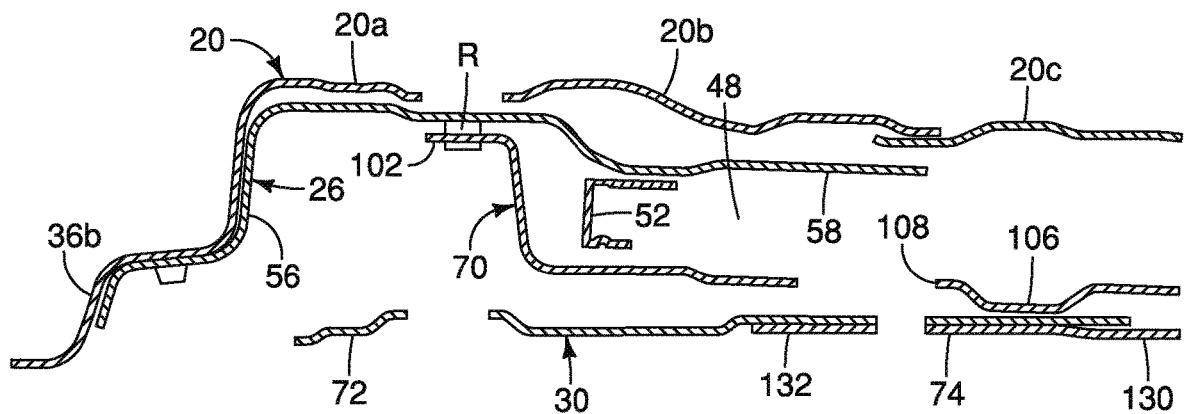
FIG. 7 is a cross-sectional view of the vehicle door assembly taken along the line 7-7 in FIG. 4 in accordance with the exemplary embodiment.

The reinforcing panel 70, the second support panel 72 and the window opening support panel 74 can assembled together as a separate structure from the inner door panel 20 thereby defining the reinforcement assembly 30. After the reinforcement assembly 30 is fully assembled, it is then installed to the inner door panel 20 and the first support bracket 26. When the reinforcement assembly 30 is assembled, at least a portion of the second support panel 72 is positioned between the reinforcing panel 70 and the window opening support panel 74, as shown in FIG. 7. The stiffening beam 76 can be installed to the window opening support panel 74 of the reinforcement assembly 30 prior to attachment to the inner door panel 20 via fasteners $F_1$. Alternatively, the stiffening beam 76 can be installed to the reinforcement assembly 30 and the inner door panel 20 after the reinforcement assembly 30 is installed to the inner door panel 20. A more detailed description of the reinforcement assembly 30 is provided further below.

In order to show orientation and relative positioning of the elements of the door assembly 14, FIG. 11 shows the reinforcing panel 70 (removed from the reinforcement assembly 30) installed to the inner door panel 20 and the first support bracket 26. However, it should be understood, that preferably, the reinforcing panel 70 is part of the reinforcement assembly 30 and is installed to the inner door panel 20 with the reinforcing panel 70 as a part of the reinforcement assembly 30.

Figure 12:
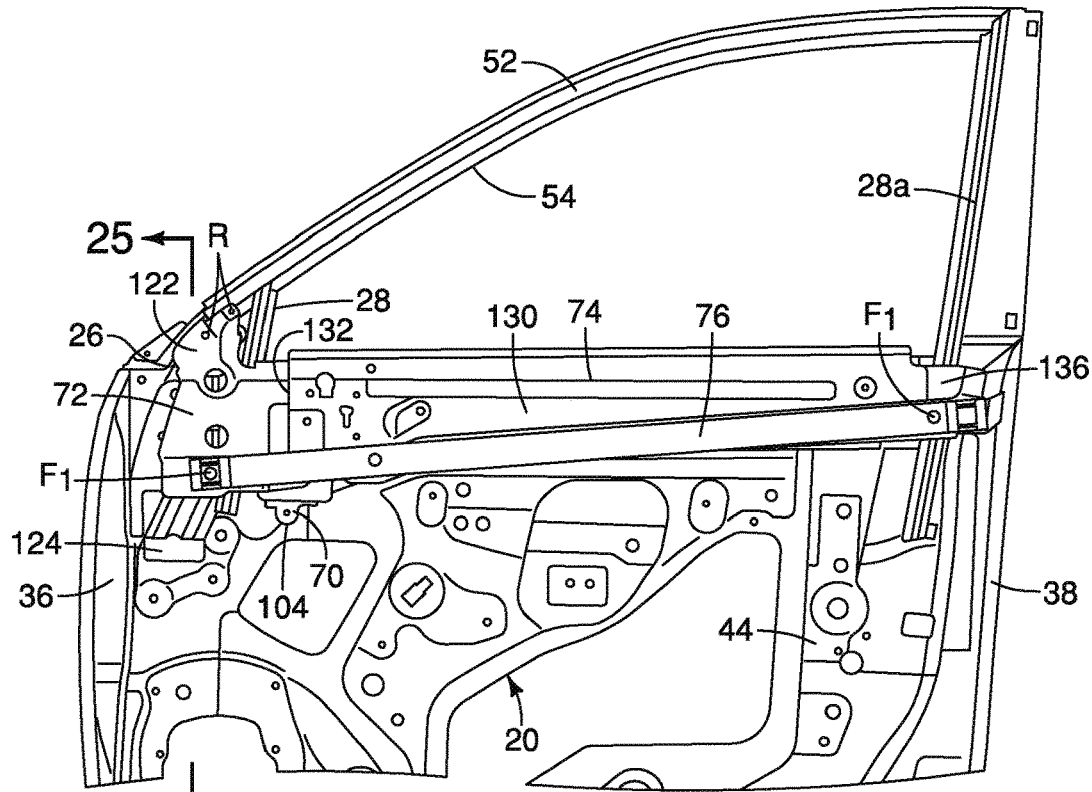
FIG. 12 is another side view of the inner door panel, the first support bracket and the portion of the window track showing all the elements of the reinforcement assembly installed to the inner door panel in accordance with the exemplary embodiment.
Figure 13:
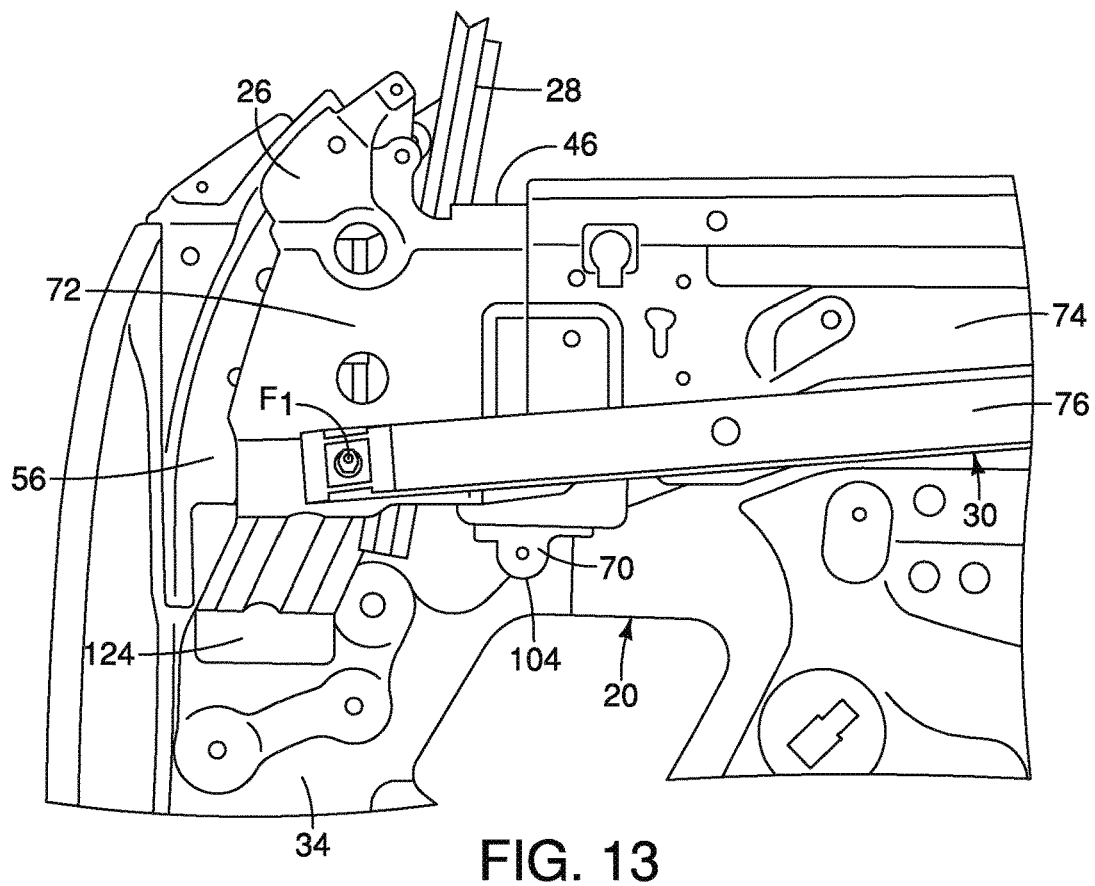
FIG. 13 is a side view of a portion of the inner door panel and a forward portion of the reinforcement assembly installed thereto in accordance with the exemplary embodiment.
Figure 14:
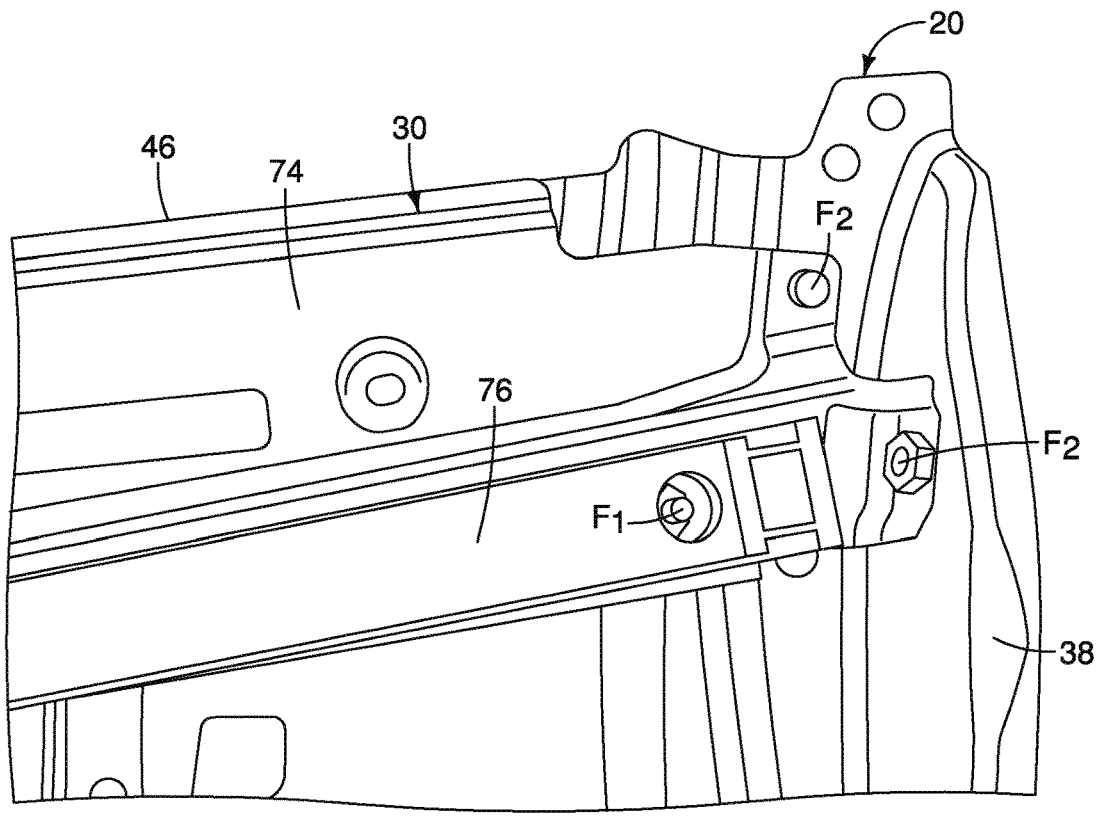
FIG. 14 is a side view of a rearward portion of the inner door panel showing a rearward portion of the reinforcement assembly installed thereto in accordance with the exemplary embodiment.

As shown in FIGS. 12-14, once the reinforcement assembly 30 is installed to the inner door panel 20, at least a portion of the reinforcing panel 70 and at least a portion of the first support bracket 26 are concealed by the reinforcement assembly 30. As shown in FIG. 14, the rearward end of the reinforcement assembly 30 is attached to the rear peripheral portion 38 of the inner door panel 20 via a fastener $F_2$. The window slot 48 is defined between the window opening support panel 74 and the upper edge portion 46 of the inner door panel 20.

Figure 15:
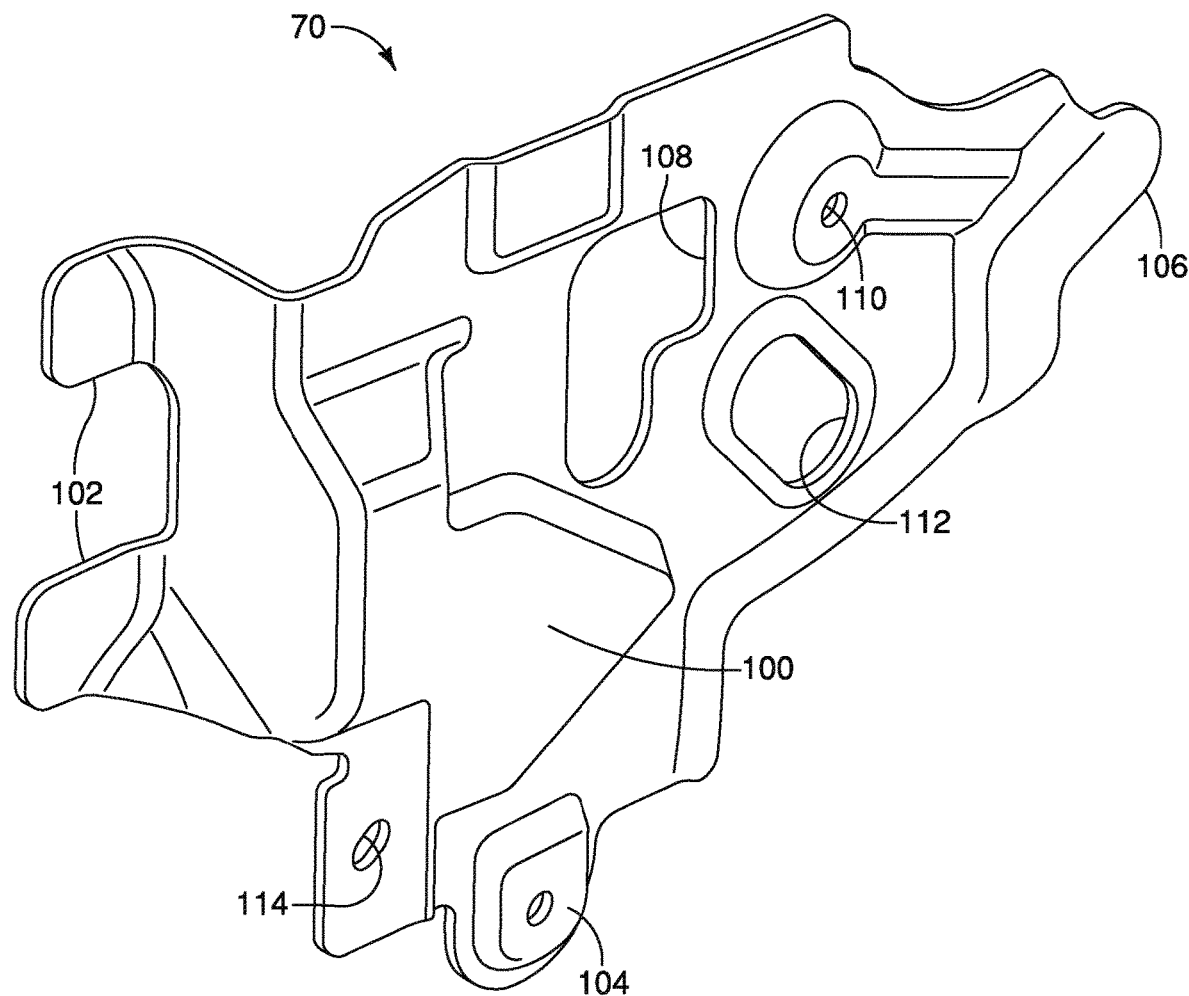
FIG. 15 is a perspective view of the reinforcing panel shown removed from the reinforcement assembly and the vehicle door assembly in accordance with the exemplary embodiment.
Figure 16:
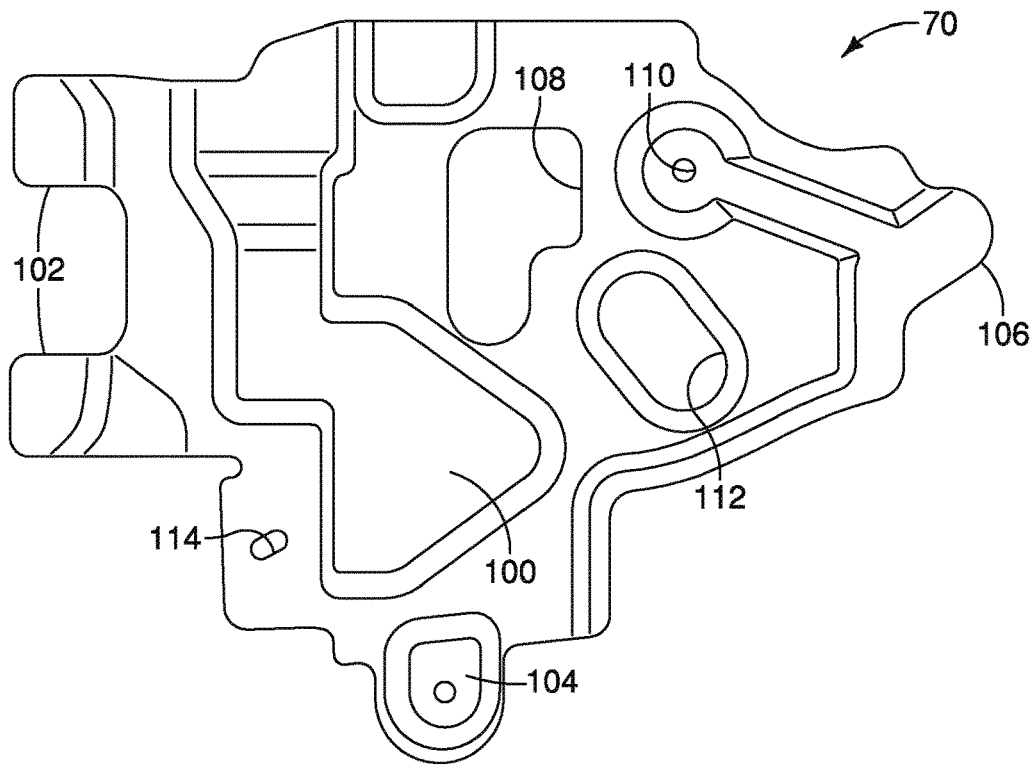
FIG. 16 is a view of an outboard side of the reinforcing panel removed from the reinforcement assembly and the vehicle door assembly in accordance with the exemplary embodiment.
Figure 17:
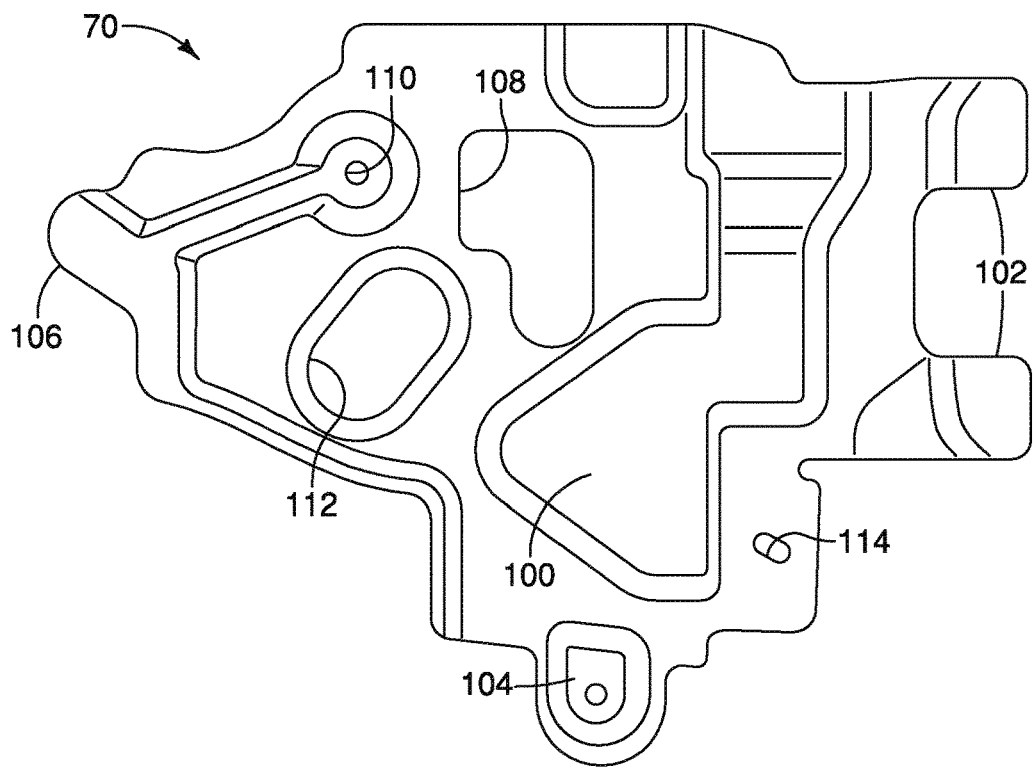
FIG. 17 is a view of an inboard side of the reinforcing panel removed from the reinforcement assembly and the vehicle door assembly in accordance with the exemplary embodiment.
Figure 18:
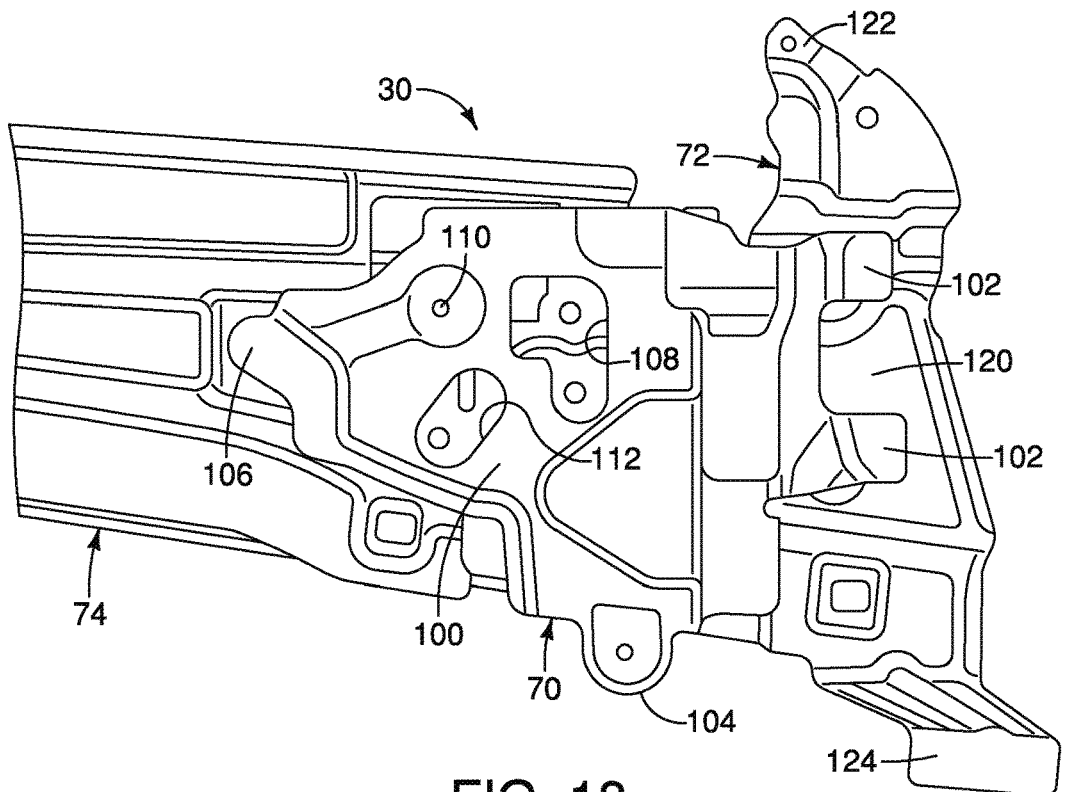
FIG. 18 is a view of the reinforcement assembly removed from the inner door panel showing an inboard side of the reinforcement assembly in accordance with the exemplary embodiment.

A description of the reinforcing panel 70 (part of the reinforcement assembly 30) is now provided with specific reference to FIGS. 15-17. The reinforcing panel 70 has a main section 100, a pair of forward flanges 102, a lower flange 104 and a rearward flange 106. The reinforcing panel 70 also includes a plurality of openings 108, 110, 112 and 114

With the reinforcement assembly 30 installed to the inner door panel 20 and the first support bracket 26, the opening 108 of the reinforcing panel 70 aligns with, but is larger than, the two mirror fastener access openings 60 in the first support bracket 26. The opening 110 of the reinforcing panel 70 aligns with the upper one of the two mirror access openings 59a in the inner door panel 20. Further, the opening 112 of the reinforcing panel 70 aligns with the upper one of the two mirror access openings 59a in the inner door panel 20.

When the reinforcement assembly 30 is installed to the inner door panel 20 and the first support bracket 26, the forward flanges 102 of the reinforcing panel 70 are both attached to the first support bracket 26. Further, the rearward flange 106 of the reinforcing panel 70 is attached the window opening support panel 74, as shown in FIG. 7. The main section 100 of the reinforcing panel 70 is located outboard relative to the window slot 48, as shown in FIG. 7. The forward flanges 102 extend in an inboard direction and attach directly to the first support bracket 26, as shown in FIGS. 7 and 11.

A description of the reinforcement assembly 30 is now provided with reference to FIGS. 6, 12-14 and 18-25. As mentioned above, the reinforcement assembly 30 includes the reinforcing, panel 70 (described above), the second support panel 72, the window opening support panel 74 and the stiffening beam 76.

Figure 20:
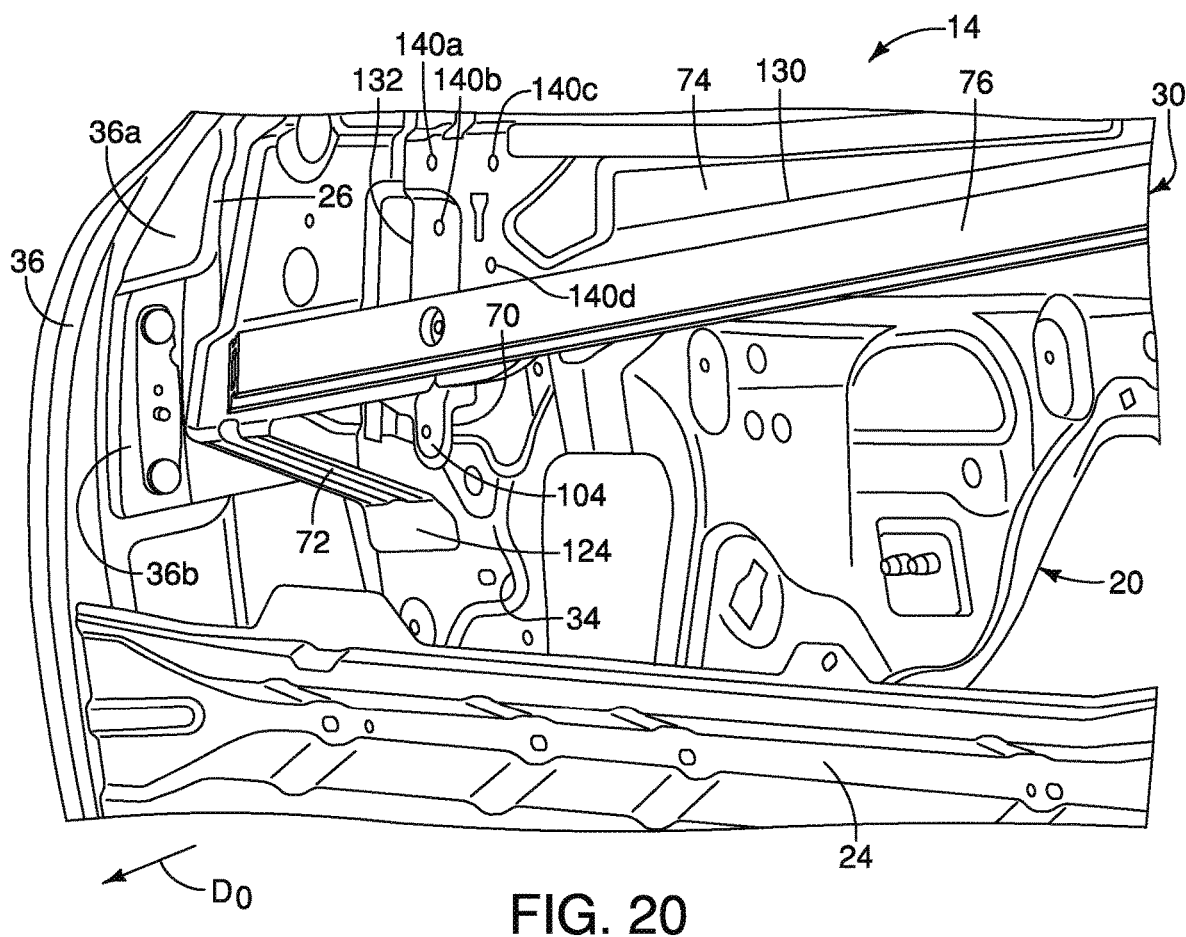
FIG. 20 is a perspective view of the reinforcement assembly attached to the inner door panel and the first support bracket showing a lower flange of the reinforcing panel fixed to the inner door panel in accordance with the exemplary embodiment.
Figure 21:
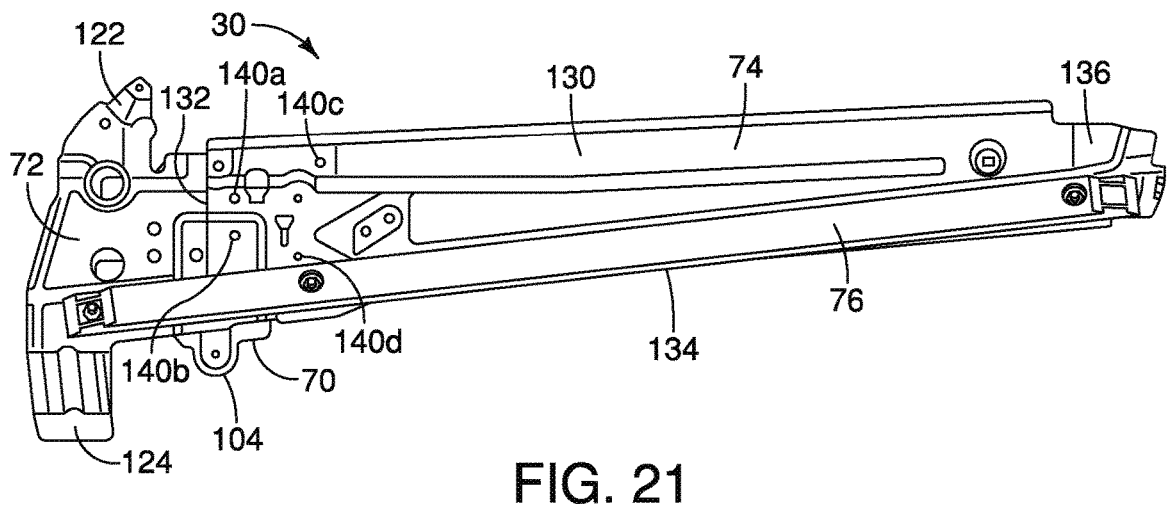
FIG. 21 is a side view of the reinforcement assembly removed from the inner door panel showing an outboard side of the reinforcement assembly with the stiffening beam installed in accordance with the exemplary embodiment.
Figure 22:
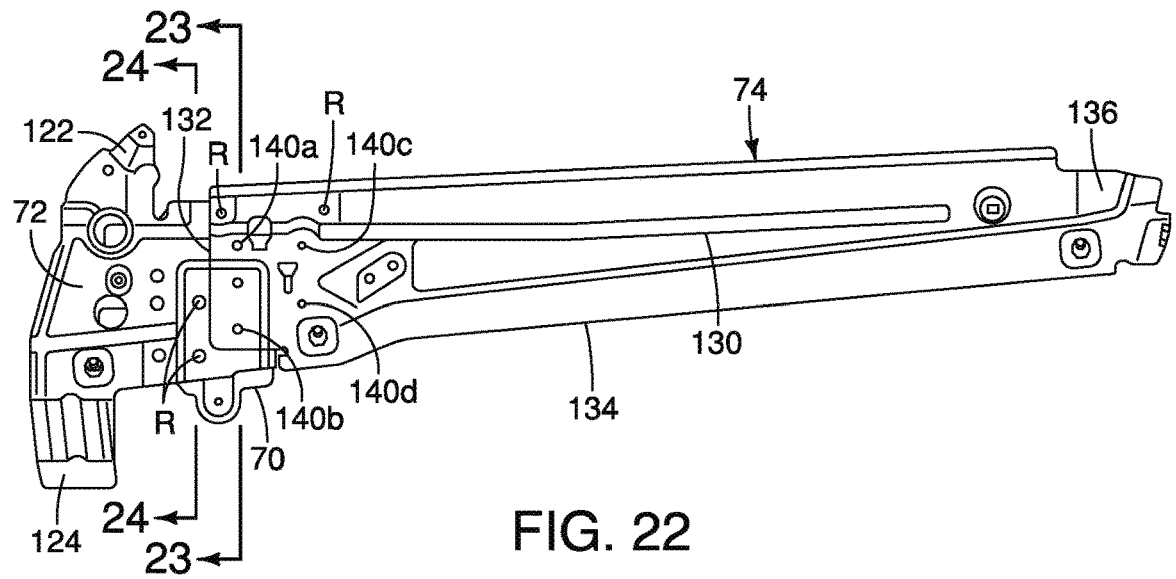
FIG. 22 is another side view of the reinforcement assembly removed from the inner door panel showing the outboard side of the reinforcement assembly with the stiffening beam removed showing a lower end of the window opening support panel in accordance with the exemplary embodiment.

As shown in FIGS. 6, 13, 18 and 20-22 the second support panel 72 has a main section 120, an upper flange portion 122 and a lower flange portion 124. When the reinforcement assembly 30 is attached to the inner door panel 20 and the first support bracket 26, the upper flange portion 122 attaches to an upper area of the second portion 58 of the first support bracket 26, as shown in FIG. 12 via rivets R. Further, as shown in FIGS. 12-13 and 20, the lower flange 124 of the second support panel 72 is attached to the main panel portion 34 of the inner door panel 20 via spot welds or rivets (not shown).

Figure 23:
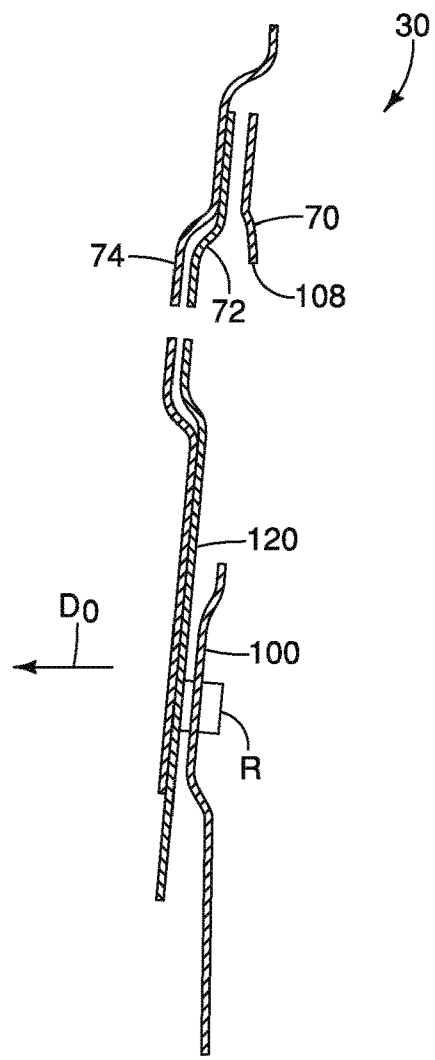
FIG. 23 is a cross-sectional view of the reinforcement assembly taken along the line 23-23 in FIG. 22 in accordance with the exemplary embodiment.
Figure 24:
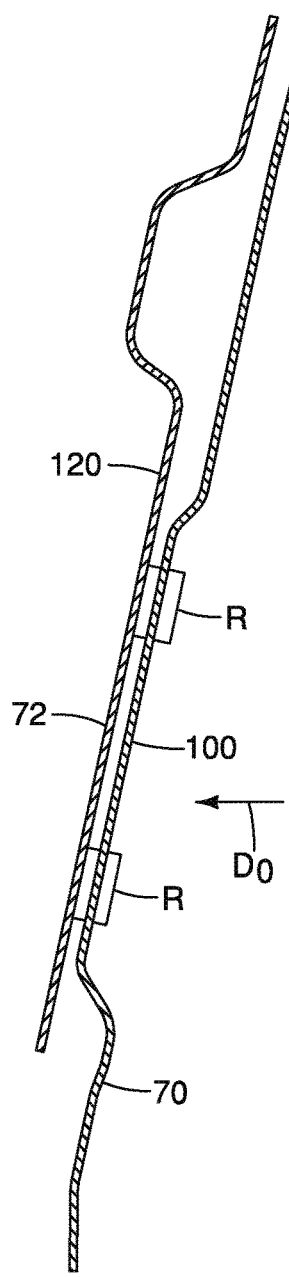
FIG. 24 is a cross-sectional view of the reinforcement assembly taken along the line 24-24 in FIG. 22 in accordance with the exemplary embodiment.

As shown in FIGS. 23 and 24, the second support panel 72 is located outboard of the reinforcing panel 70 and is dimensioned and shaped to overlay at least a portion of the reinforcing panel 70. As is also shown in FIGS. 23 and 24, the main section 120 of the second support panel 72 is attached and the reinforcing panel 70 via rivets R. Hence, as shown in FIGS. 23 and 24, a non-edge portion of the second support panel 72 is fixed to a non-edge portion of the reinforcing panel 70.

As shown in FIGS. 2, 4-6, 12-14 and 20-22, the window opening support panel 74 is an elongated panel that includes a main panel 130, a front end 132, a lower end 134 and a rear end 136. An area of the main panel 130 adjacent to the front end 132 includes four openings 140a, 140b, 140c and 140d.

Figure 4:
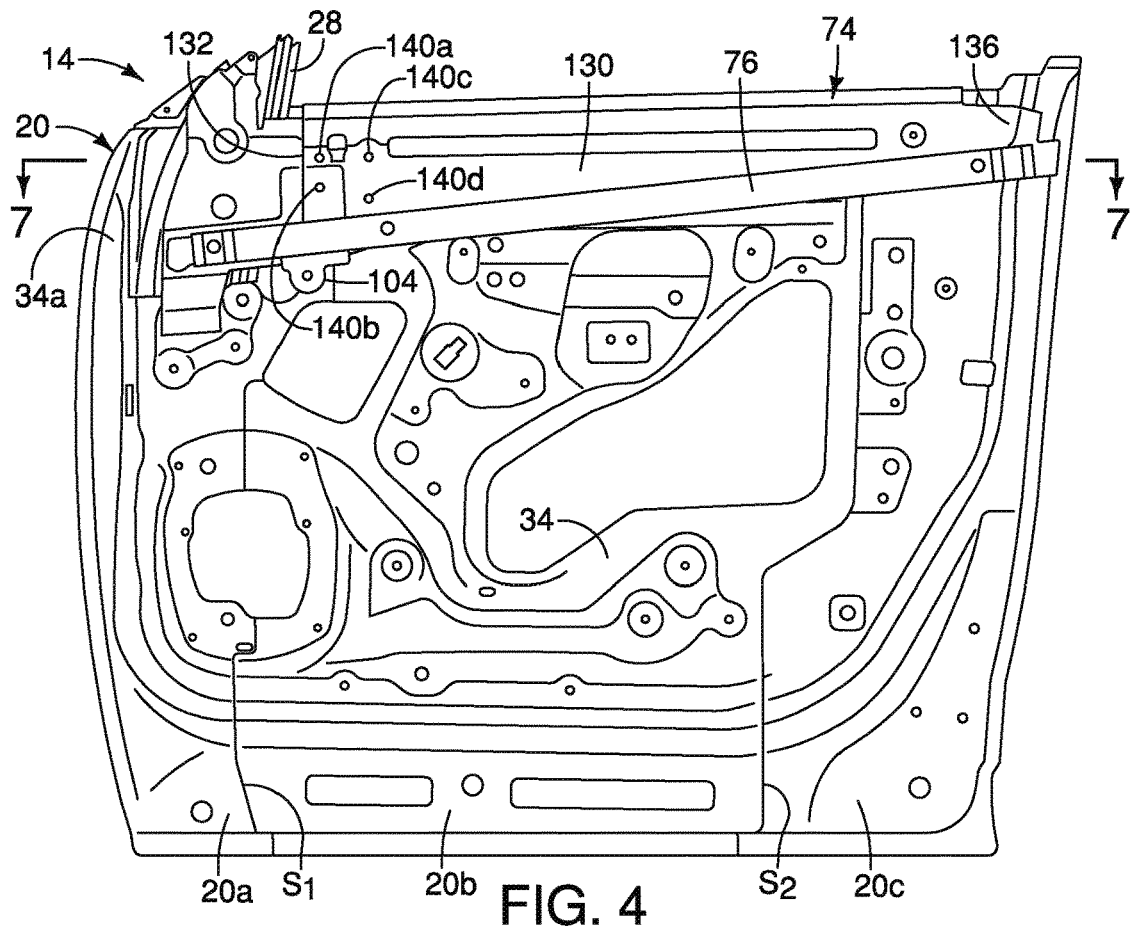
FIG. 4 is another side view of the vehicle door assembly partially dis-assembled to show features of the inner door panel and the reinforcement assembly in accordance with the exemplary embodiment.

The window opening support panel 74 is dimensioned and shaped such that the rear end 136 of the window opening support panel 74 is attached to a rear portion of the inner door panel 20 adjacent to the rear peripheral portion 38, as shown in FIGS. 5, 12 and 14. As shown in FIGS. 2, 4, 12 The front end 132 of the window opening support panel 74 overlays a rearward portion of the second support panel 72 and is further attached to the second support panel 72. The window opening support panel 74 further defines an outboard side of the window slot 48.

The stiffening beam 76 is attached to the window opening support panel 74 covering most if not all of the lower end 136 thereof. The stiffening beam 76 is also referred to herein below as the bracing member 76.

During the assembly of the reinforcement assembly 30, the following connections are made between the various elements thereof. For example, as shown in FIG. 7, the window opening support panel 74 overlays and is welded or riveted (rivets not shown) to the rearward portion of the second support panel 72. Further, in the area where the window opening support panel 74 overlays the second support panel 72, the second support panel 72 overlays, contacts and is attached to the rearward flange 106 of the reinforcing panel 70 by welding or a rivet (not shown). As noted above, when the reinforcement assembly 30 is installed to the inner door panel 20 and the first support bracket 26, the forward flanges 102 of the reinforcing panel 70 is fixed to the first support bracket 26 via the rivet R.

Further, as shown in FIG. 23, the main section 100 of the reinforcing panel 70 and the main section 120 of the second support panel 72 are fixed to one another by the rivet R. Further the window opening support panel 74 can further be fixed to the main section 100 of the reinforcing panel 70 and the main section 120 of the second support panel 72 via the depicted rivet.

As shown in FIG. 24, the main section 100 of the reinforcing panel 70 and the main section 120 of the second support panel 72 are fixed to one another by two additional rivets R.

Figure 25:
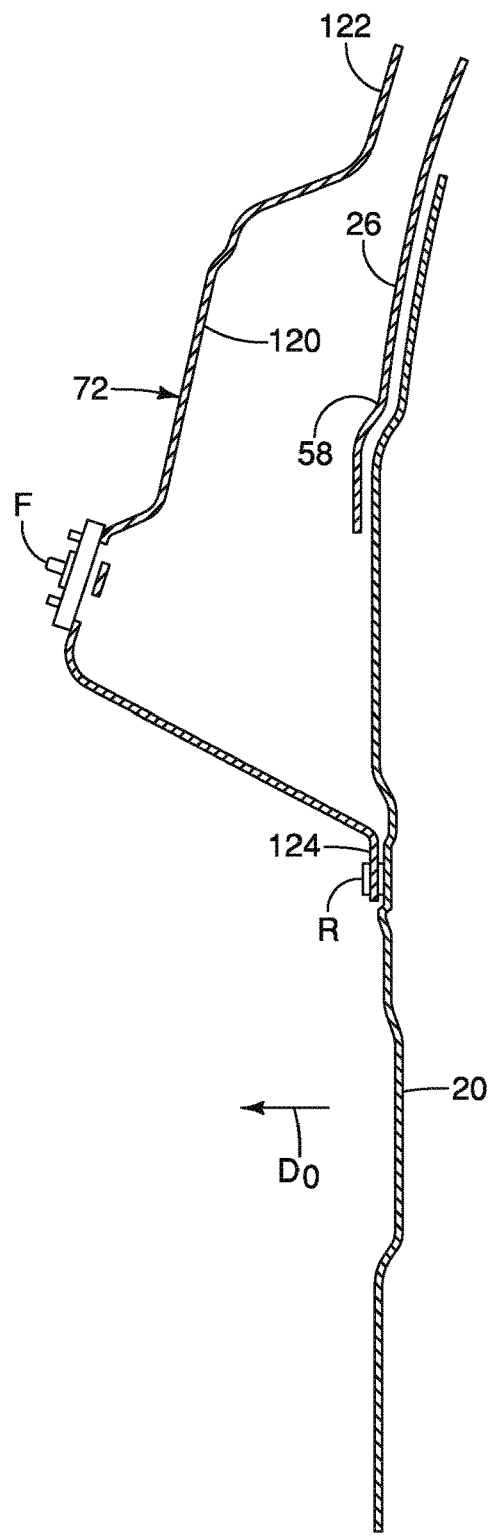
FIG. 25 is a cross-sectional view of the reinforcement assembly taken along the line 25-25 in FIG. 12 in accordance with the exemplary embodiment.
Figure 26:
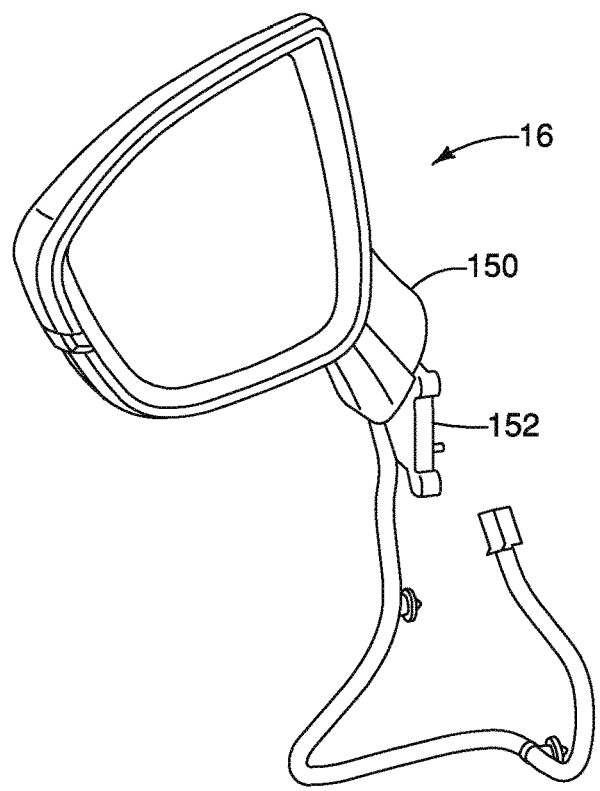
FIG. 26 is a perspective view of the side mirror assembly removed from the vehicle door assembly in accordance with the exemplary embodiment.
Figure 27:
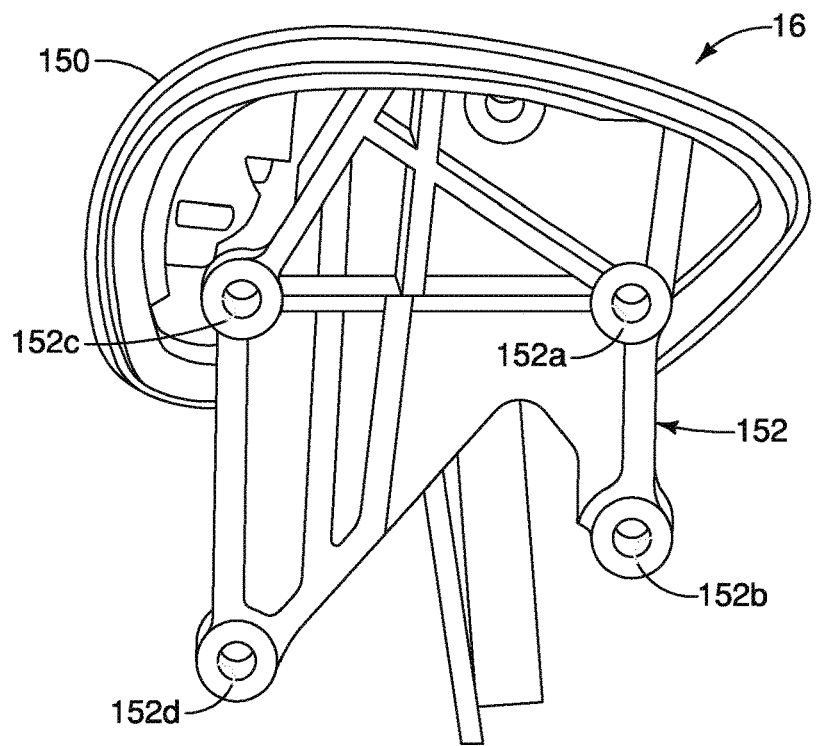
FIG. 27 is an end view of an inboard side of the side mirror assembly showing an attachment flange and fastener receiving openings in accordance with the exemplary embodiment.

As shown in FIG. 25, the inner door panel 20 is fixed to the lower flange 124 of the second support panel 72 via the depicted rivet thereby attaching a front lower portion of the reinforcement assembly 30 to the inner door panel.

The side mirror assembly 16 is a conventional mirror that has a base 150 with an attachment flange 152. When the mirror assembly 16 is attached to the door assembly 14, the attachment flange 152 is inserted into an opening (not shown) in the outer door panel 32. The attachment flange 152 includes four openings 152a, 152b, 152c and 152d.

The fasteners $F_3$ depicted in FIG. 6 are used to install the mirror assembly 16 to the door assembly 14. A first one of the fasteners $F_3$ is installed through the slot 59 in the inner door panel 20, through an upper one of the openings 60 in the first support bracket 26, then through an upper portion of the slot 108 in the reinforcing bracket 70, through the opening 140a in the window opening support panel 74 and finally into the threaded opening 152a in the attachment flange 152 of the mirror assembly 16. The slot 59, the openings 60 and the slot 108 are all larger than the head of the fasteners $F_3$. However, the opening 140a in the window opening support panel 74 is only dimensioned to allow a threaded portion of the fasteners $F_3$ to extend therethrough. Therefore, when the first of the fasteners $F_3$ is tightened, that portion of the attachment flange 152 is now supported and attached to the window opening support panel 74.

A second one of the fasteners $F_3$ is installed through a lower portion of the slot 59 in the inner door panel 20, through a lower one of the openings 60 in the first support bracket 26, then through a lower portion of the slot 108 in the reinforcing bracket 70, through the opening 140b in the window opening support panel 74 and finally into the threaded opening 152b in the attachment flange 152 of the mirror assembly 16. The slot 59, the openings 60 and the slot 108 are all larger than the head of the fasteners $F_3$. However, the opening 140b in the window opening support panel 74 is only dimensioned to allow a threaded portion of the fasteners $F_3$ to extend therethrough. Therefore, when the second of the fasteners $F_3$ is tightened, that portion of the attachment flange 152 is now also supported and attached to the window opening support panel 74.

A third one of the fasteners $F_3$ is installed through the upper one of the openings 59a in the inner door panel 20, through the opening 110 in the reinforcing bracket 70, through the opening 140c in the window opening support panel 74 and finally into the threaded opening 152c in the attachment flange 152 of the mirror assembly 16. The opening 59a is larger than the head of the fasteners $F_3$. However, the opening 110 in the reinforcing bracket 70 and the opening 140c in the window opening support panel 74 are only dimensioned to allow a threaded portion of the fasteners $F_3$ to extend therethrough. Therefore, when the third of the fasteners $F_3$ is tightened, that portion of the attachment flange 152 is now supported and attached to both the reinforcing bracket 70 and the window opening support panel 74.

The fourth and final one of the fasteners $F_3$ is installed through the lower one of the openings 59a in the inner door panel 20, through the slot 112 in the reinforcing bracket 70, through the opening 140d in the window opening support panel 74 and finally into the threaded opening 152d in the attachment flange 152 of the mirror assembly 16. The opening 59a and the slot 112 are larger than the head of the fasteners $F_3$. However, the opening 140d in the window opening support panel 74 is only dimensioned to allow a threaded portion of the fasteners $F_3$ to extend therethrough. Therefore, when the fourth one of the fasteners $F_3$ is tightened, that portion of the attachment flange 152 is now supported and attached to the window opening support panel 74.

It should be understood from the above description that with the reinforcement assembly 30 attached properly to the inner door panel 20, the slot 59 in the inner door panel 20, the upper one of the openings 60 in the first support bracket 26, the upper portion of the slot 108 in the reinforcing bracket 70 and the opening 140a in the window opening support panel 74 are all aligned with the threaded opening 152a in the attachment flange 152 of the mirror assembly 16. Similarly, the slot 59 in the inner door panel 20, the lower one of the openings 60 in the first support bracket 26, the lower portion of the slot 108 in the reinforcing bracket 70 and the opening 140b in the window opening support panel 74 are all aligned with the threaded opening 152b in the attachment flange 152 of the mirror assembly 16.

As well, the upper one of the openings 59a in the inner door panel 20, the opening 110 in the reinforcing bracket 70, the opening 140c in the window opening support panel 74 and the threaded opening 152c in the attachment flange 152 of the mirror assembly 16 are all aligned. Further, the lower one of the openings 59a in the inner door panel 20, the slot 112 in the reinforcing bracket 70 and the opening 140d in the window opening support panel 74 are all aligned with the threaded opening 152d in the attachment flange 152 of the mirror assembly 16.

The above described panels and elements of the door assembly 14 can all be made of aluminum or a steel based material. However in a preferred embodiment, one or more, or all of the inner door panel 20, the first support bracket 26, the reinforcing panel 70, the second support panel 72, the window opening support panel 74 and the outer door panel 32 are all made of aluminum or an aluminum alloy.

The inclusion of the reinforcing panel 70 in the above described structure strengthens and stiffens the area of the vehicle door assembly 14 where the side mirror assembly 16 is installed reducing and/or preventing vibrations of the mirror assembly 16 when driving the vehicle 10 at high speeds.

The various vehicle body structures of the vehicle 10 (other that the vehicle door assembly 14) are conventional components that are well known in the art. Since these vehicle body structures are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
an inner door panel having a main panel portion that extends the full horizontal length of the door assembly and a front peripheral portion that extends laterally in an outboard direction and defines the outer periphery of the inner door panel, such that the main panel portion and the front peripheral portion define inboard and forward boundaries of a door cavity;
a first support bracket attached to a front portion of the inner door panel, the first support bracket including a first portion and a second portion, the first portion extending laterally in the outboard direction from the second portion and overlays an upper area of the front peripheral portion of the inner door panel, the second portion overlaying a forward upper area of the main panel portion of the inner door panel and being fixed thereto;
a reinforcing panel attached to the first support bracket;
a second support panel attached to the first support bracket and the reinforcing panel;
a window opening support panel attached to a rear portion of the inner door panel, the second support panel and the reinforcing panel;
an outer door panel fixed to an outer periphery of the inner door panel such that the inner door panel and the outer door panel further define the door cavity therebetween;
a side mirror assembly installed along an exterior side of the outer door panel, the side mirror assembly including fasteners that extend through the window opening support panel and the second support panel; and
a window track attached to the first support bracket with the window track being located between the first support bracket and the reinforcing panel.

2. The vehicle door assembly according to claim 1, wherein
the window opening support panel defines an outboard side of a window slot extending from the front portion of the inner door panel to the rear portion of the inner door panel.

3. The vehicle door assembly according to claim 2, wherein
the reinforcing panel has a main section, a forward flange portion, a lower flange and a rearward flange, the forward flange being attached to the first support bracket and the rearward flange being attached an inboard surface of the window opening support panel.

4. The vehicle door assembly according to claim 3, wherein
an upper edge portion of the inner door panel defines an inboard side of the window slot with the main section of the reinforcing panel being located outboard relative to the window slot.

5. The vehicle door assembly according to claim 1, further comprising
a bracing member fixedly attached to a lower area of the window opening support panel.

6. The vehicle door assembly according to claim 1, wherein
the second support panel and the window opening support panel are provided with aligned mirror attachment openings spaced apart from one another such that the side mirror assembly is fixed thereto.

7. The vehicle door assembly according to claim 6, wherein
the first support bracket is provided with at least one mirror attachment opening aligned with at least one of the mirror attachment openings in the second support panel and the window opening support panel.

8. The vehicle door assembly according to claim 1, wherein
the first support bracket, the reinforcing panel, the second support panel and the window opening support panel are all made of aluminum.

9. The vehicle door assembly according to claim 1, wherein
the inner door panel, the first support bracket, the reinforcing panel, the second support panel, the window opening support panel and the outer door panel are all made of aluminum.

10. A vehicle door assembly, comprising:
an inner door panel;
a first support bracket attached to a front portion of the inner door panel;
a reinforcing panel attached to the first support bracket;

a second support panel attached to the first support bracket and the reinforcing panel;

a window opening support panel attached to a rear portion of the inner door panel, the second support panel and the reinforcing panel;

an outer door panel fixed to an outer periphery of the inner door panel such that the inner door panel and the outer door panel further define the door cavity therebetween; and a side mirror assembly installed along an exterior side of the outer door panel, the side mirror assembly including fasteners that extend through the window opening support panel and the second support panel, the reinforcing panel having a main section, a forward flange portion, a lower flange and a rearward flange, the forward flange being attached to the first support bracket and the rearward flange being attached the window opening support panel.

11. The vehicle door assembly according to claim 10, wherein an upper edge portion of the inner door panel defines an inboard side of a window slot with the main section of the reinforcing panel being located outboard relative to the window slot.

12. A vehicle door assembly, wherein comprising:

an inner door panel;

a first support bracket attached to a front portion of the inner door panel;

a reinforcing panel attached to the first support bracket;

a second support panel attached to the first support bracket and the reinforcing panel;

a window opening support panel attached to a rear portion of the inner door panel, the second support panel and the reinforcing panel;

an outer door panel fixed to an outer periphery of the inner door panel such that the inner door panel and the outer door panel further define the door cavity therebetween; and a side mirror assembly installed along an exterior side of the outer door panel, the side mirror assembly including fasteners that extend through the window opening support panel and the second support panel, the second support panel being located outboard of the reinforcing panel and being dimensioned and shaped to overlay at least a portion of the reinforcing panel, with a non-edge portion of the second support panel being fixed to a non-edge portion of the reinforcing panel.

13. A vehicle door assembly, comprising:

an inner door panel;

a first support bracket attached to a front portion of the inner door panel;

a reinforcing panel attached to the first support bracket;

a second support panel attached to the first support bracket and the reinforcing panel;

a window opening support panel attached to a rear portion of the inner door panel, the second support panel and the reinforcing panel;

an outer door panel fixed to an outer periphery of the inner door panel such that the inner door panel and the outer door panel further define the door cavity therebetween; and a side mirror assembly installed along an exterior side of the outer door panel, the side mirror assembly including fasteners that extend through the window opening support panel and the second support panel, the reinforcing panel, the second support panel and the window opening support panel are assembled together with the second support panel being positioned between the reinforcement panel and the window opening support panel separate from their attachment to the inner door panel.

14. A vehicle door assembly comprising:

an inner door panel;

a first support bracket attached to a front portion of the inner door panel;

a reinforcing panel attached to the first support bracket;

a second support panel attached to the first support bracket and the reinforcing panel;

a window opening support panel attached to a rear portion of the inner door panel, the second support panel and the reinforcing panel;

an outer door panel fixed to an outer periphery of the inner door panel such that the inner door panel and the outer door panel further define the door cavity therebetween; and a side mirror assembly installed along an exterior side of the outer door panel, the side mirror assembly including fasteners that extend through the window opening support panel and the second support panel, the second support panel and the window opening support panel being provided with aligned mirror attachment openings spaced apart from one another such that the side mirror assembly is fixed thereto, and the reinforcing panel being provided with one mirror attachment opening aligned with one of the mirror attachment openings in the second support panel and the window opening support panel.

15. A vehicle door assembly comprising:

an inner door panel;

a first support bracket attached to a front portion of the inner door panel;

a reinforcing panel attached to the first support bracket;

a second support panel attached to the first support bracket and the reinforcing panel;

a window opening support panel attached to a rear portion of the inner door panel, the second support panel and the reinforcing panel;

an outer door panel fixed to an outer periphery of the inner door panel such that the inner door panel and the outer door panel further define the door cavity therebetween; and a side mirror assembly installed along an exterior side of the outer door panel, the side mirror assembly including fasteners that extend through the window opening support panel and the second support panel, the second support panel and the window opening support panel being provided with aligned mirror attachment openings spaced apart from one another such that the side mirror assembly is fixed thereto, the inner door panel being provided with a plurality of access openings aligned with the mirror attachment openings in the support panel and the window opening support panel.

\* \* \* \* \*